July 18, 1961  A. S. McKAY  2,993,119
SUBSURFACE EXPLORATION
Filed Dec. 23, 1957
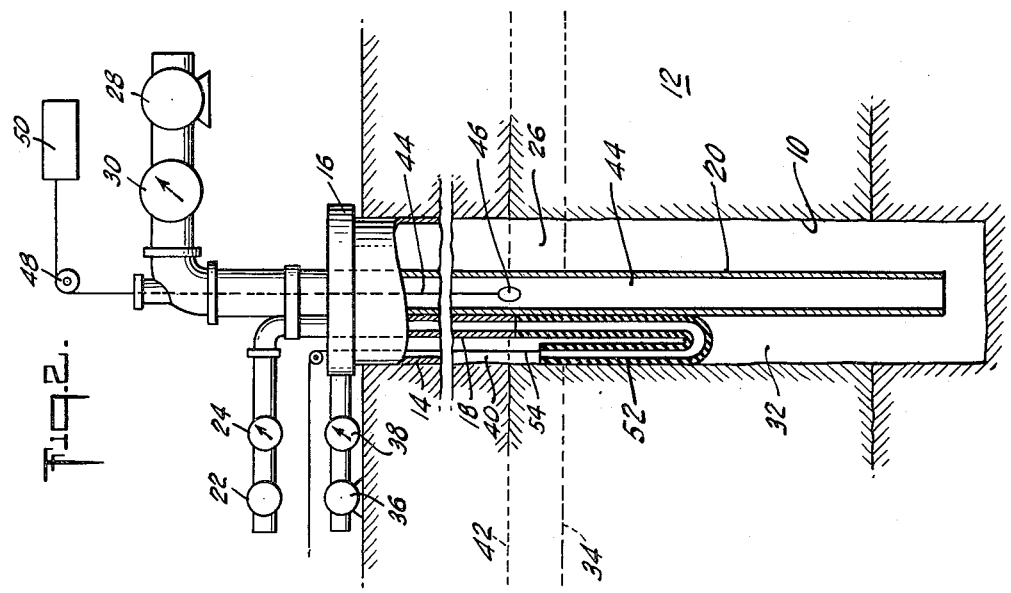
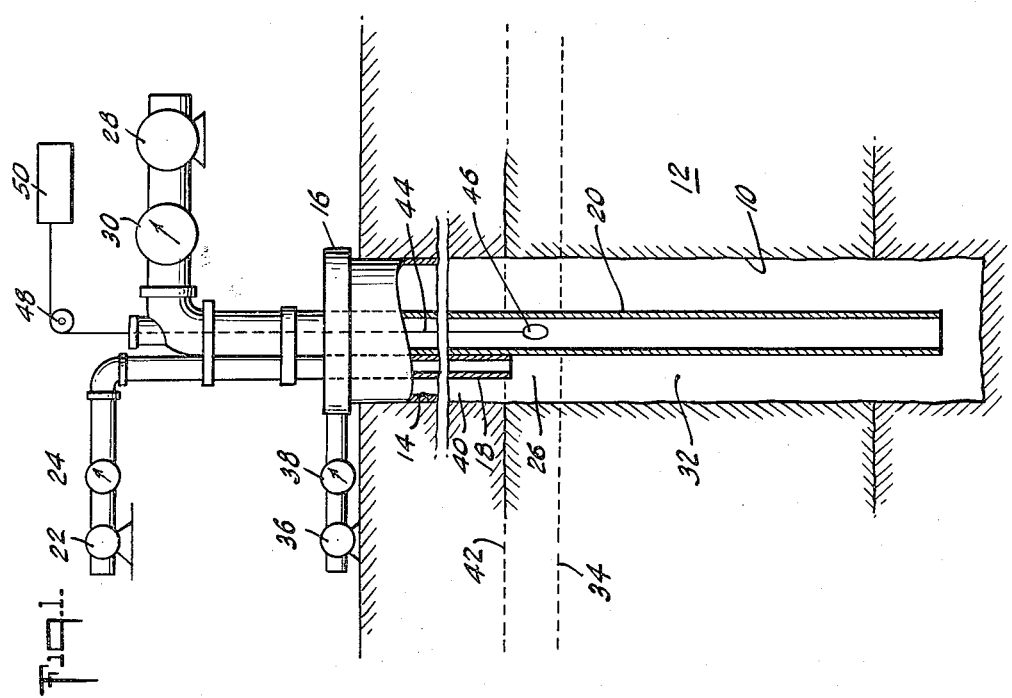

United States Patent Office 2,993,119
Patented July 18, 1961

2,993,119
SUBSURFACE EXPLORATION
Alexander S. McKay, Houston, Tex., assignor to Texaco Inc., a corporation of Delaware
Filed Dec. 23, 1957, Ser. No. 704,814
7 Claims. (Cl. 250—43.5)

This invention relates to a method of studying subsurface earth formations and more particularly to a method of measuring the permeability of earth formations traversed by a well or borehole. A main purpose of this invention is the provision of a method by means of which accurate measurements can be made without the use of complicated equipment.

An object of the invention is the provision of a method for use in fluid, such as gas or water, injection wells in which it is desired to know the amount of fluid passing into various increments of an exposed, more or less permeable formation. This is sometimes referred to as an injectivity profile or permeability log of a well.

The importance of secondary recovery or repressuring in oil fields has increased greatly during the last few years and there is consequently a real need for a better understandings of the engineering aspects of these projects. Detailed studies of reservoir performance under water flooding conditions can be undertaken only when certain basic data are available and among the data which is necessary is information concerning the vertical distribution of the injected fluid in a fluid injection well. One method for determining the vertical distribution of the injected fluid in an injection well is described in U.S.P. 2,700,734, granted to Egan and Herzog on January 25, 1955.

In accordance with the disclosure in this patent as it is applied to the making of an injection profile of a formation into which fluid is to be injected, two streams of fluid such as water are pumped into the well, one stream through a string of tubing extending downward below the formation and the other stream downward through the annular space between the tubing and the casing or the walls of the hole. The streams are pumped simultaneously but separately and each stream is carefully metered at the surface. The water pumped down through the tubing flows out of the lower end thereof and upward around the tubing until it meets the water pumped downwardly around the tubing forming an interface between the two streams or bodies of water. A small amount of a tracer material such as a radioactive substance is added to one of the streams. In order to locate the interface a radiation detector is passed through the tubing, its depth being recorded continuously and from the record of the output of the detector the depth of the interface can be ascertained since the response of the detector will change more or less suddenly when the detector passes from the radioactive water to the non-radioactive water or vice versa.

The rates of injection or pumping of the two streams is varied by means of pumps or suitable valves located at the surface, the rates being adjusted so that at all times the sum of the rates remains constant. By increasing the ratio of the amount of radioactive water pumped to non-radioactive water pumped, the interface will move through the well along the exposed walls of the zone to be examined. The rates of the injection of the two streams are varied by increments and the interface will therefore move by steps, the vertical length of these steps depending on the permeability of the formation. After each adjustment or change in rates of injection the radiation detector is passed through the well and a record made of the depth of the interface after each such adjustment. The difference between successive rates of injection of one of the streams which established successive stabilized interfaces is equal to the injectivity rate into the formation in the interval between the successive positions of the stabilized interfaces.

In accordance with the present invention the vertical distribution of the injected fluid in an injection well is determined by simultaneously introducing three fluid streams into the formation. The first stream having a rate of flow of a predetermined percentage of the total flow injected into the borehole is introduced into the hole through suitable conduit to a first point or depth in a borehole substantially at one end of the zone of interest of the borehole. The second stream is introduced into the borehole through tubing to a point which is at a depth below the first point, while the third stream passes down through the annulus between the casing and the conduit and tubing. With the three bodies of fluids in the borehole interfaces will exist between the uppermost and intermediate fluids and between the intermediate and lowermost fluids. To readily identify these interfaces one of the fluids adjacent each interface has incorporated in it a substance which will render the fluid identifiable and this substance may be any of the well-known radioactive tracers. Means are provided in the form of radioactivity detectors which can be passed through the borehole, preferably through the tubing, for locating these interfaces. By maintaining constant the total rate of flow of the injected fluid and, preferably, the predetermined percentage of the rate of flow of the first stream and by varying the rate of flow of the other two streams by increments, preferably, equal to the predetermined percentage, the vertical distribution of the injected fluid into the zone of interest in the injection well can be readily determined.

The method of the present invention has the advantage of giving a direct measurement of the amount of fluid passing out of the borehole into a given interval of the formation whereas the one interface method described in the above-mentioned U.S.P. 2,700,734 requires a subtraction process in order to obtain the same information. In order to more clearly understand this inveintion reference may be had to the accompanying drawing in which:

FIG. 1 is a diagrammatic vertical sectional view of a well or borehole traversing a permeable formation showing the arrangement of the apparatus employed in accordance with this invention; and FIG. 2 is a diagrammatic vertical sectional view of a well showing a modified form of the apparatus of FIG. 1.

Referring to the drawing, a well or borehole 10 is illustrated as passing through a formation 12. The upper portion of the well 10 is provided with a conventional casing 14 closed at the top by means of a suitable casing head 16. Passing down through the borehole 10 to a point within the vertical limits of the formation 12 and preferably a point near one of these limits is a first conduit or string of tubing 18. Also, extending down through the borehole 10 to a point below the formation 12 is a second conduit or string of tubing 20. A first pump 22 is connected to the upper end of the first string of tubing 18 through a suitable meter 24 and serves to pump the first stream of fluid through the tubing 18 to provide a first body of fluid 26 in the borehole 10. A second pump 28 is connected to the upper end of the second string of tubing 20 through a suitable meter 30 and serves to pump a second stream of fluid through the tubing 20 to provide a second body of fluid 32 in the borehole 10. A first interface 34 will exist between the two bodies of fluids 26 and 32. A third pump 36 is connected to the casing head 16 through a meter 38 and serves to pump a third stream of fluid through the casing 14 into the annular space between the casing 14 or the walls of the borehole 10 and the tubings 18 and 20 to provide a third body of fluid 40 in the borehole 10. A second interface 42 will exist between the first and third bodies of fluids 26 and 40.

By properly adjusting or controlling the pumping rates of the three fluid streams the two interfaces 34 and 42 can be moved along the wall of the borehole and at any desired spacing from each other.

In order to readily identify the location of each of the two interfaces 34 and 42 the fluid on one side of each of the interfaces must have a detectable characteristic which can be distinguished from the fluid on the opposite side of the interface. Preferably, a small amount of a tracer material such as a radioactive substance is added to at least one of the fluid streams being introduced into the borehole. This radioactive stream is preferably introduced into the first body of fluid 26 before that fluid is pumped through tubing 18 by the first pump 22.

Shown as suspended within the second conduit or tubing 20 on a conductor cable 44 is a radiation detector 46 suitable for detecting the presence of the radioactive substance in the first body of fluid 26. The cable 44 passes upwardly over a suitable cable-measuring device 48 which will indicate or register continuously the depth of the radiation detector 46 in the borehole 10. The cable 44 then passes to an amplifying and recording device 50 which records the output of the radiation detector, preferably on a moving tape.

In a preferred form of the method of this invention the vertical distribution of the injected fluid into formation 12 is determined by simultaneously introducing the three streams of fluid into the borehole 10. The rate of flow of the first stream is set at a predetermined percentage of the total fluid flow into the borehole and maintained constant at all times. The rate of flow of the other two streams is varied by increments equal to the predetermined percentage while maintaining the total fluid flow constant.

More specifically the procedure is as follows. The total flow rate of the three streams is kept constant. The flow rate of the first stream is fixed at a predetermined value such as 10 percent of the total flow rate. The amount of fluid injected into a first vertical interval of the formation 12 may be determined by establishing flow rates of 10 percent, 90 percent and 0 percent of the total flow rate for the first, second and third streams, respectively, while the lower end of the first tubing 18 is held near the upper limit of the formation 18 within the first vertical interval. Assuming that there is no loss into the formation above the formation 12 the second interface 42 which is the interface between the first and third bodies of fluid 26 and 40 will become stabilized at the upper limit of the formation 12, as shown in the figures of the drawings. The other interface 34 will become stabilized at a point in the borehole 10 somewhat below the interface 42 depending upon the permeability of formation 12 in the vicinity of its upper limit. The location of these two interfaces 34 and 42 can be readily detected by passing the radiation detector 46 through the borehole, and it is then known that the rate of injection into the formation between the location of these two interfaces which define the first interval or increment of formation 12 is equal to the rate of flow of the first stream, that is, 10 percent of the total rate of flow of the three streams.

The tubing 18 is then lowered to a position just below the location of the first stabilized lower interface, the rates of flow of the stream is adjusted so that the rates of flow of the first, second and third fluid streams are equal to 10, 80 and 10 percent respectively, after the two interfaces again become stabilized the radiation detector 46 is again passed through the borehole to again locate the position of the two interfaces 34 and 42.

Assuming that the fluids have approximately the same composition it can be seen that the upper interface will now stabilize at the location of the first stabilized lower interface. Since the predetermined rate of flow of the first stream, that is, 10 percent of the total flow is again flowing into the formation between the two stabilized interfaces 34 and 42 a second interval or increment of the formation lying immediately below the first interval and again defined by the position of the two interfaces 34 and 42 is receiving the same quantity of fluid as the first interval, though the vertical extent of the two intervals may differ. It can be seen that the length of each of these intervals will vary depending upon the permeability of the formation in the particular region. The rates of flow of the second and third streams are repeatedly varied until the injection rate into the lowermost interval of the formation is determined, that is until 90 percent of the total rate of flow is flowing in the third stream and 0 percent is flowing in the second stream.

Instead of moving the tubing 18 with each change of flow rate of the second and third streams a flexible hose 52 may be attached to the lower end of the tubing 18 as shown in FIG. 2 of the drawing. The open end of the hose 52 may be readily placed at any desired level by means of a wire line 54 which may be run up to the surface of the earth. Where necessary, a suitable weight, not shown, may be attached to the open end of the hose to assist in lowering the end thereof to any desired point.

Although the above procedure calls for flow rate changes of increments equal to the rate of flow of the first fluid stream in order to automatically position a succeeding upper interface at the location of the preceeding stabilized lower interface, the rates of change of the second and third streams may be different from the value of the flow rate of the first stream. In the case where the change of flow rates of the second and third streams is by increments greater than the flow rate of the first stream both interfaces will become stabilized at positions which are lower than the location of the preceding stabilized lower interface. However, the injection rate into the interval of the formation between the location of a stabilized upper interface and the location of the preceding stabilized lower interface can be readily calculated. For example, if the first stream has a flow rate of 10 percent of the total, flow rate of the fluid into the well the second stream 90 percent and the third stream 0 percent, the rate of injection into the increment of the formation 12 between the two interfaces is equal to 10 percent of the total flow rate as previously described. Now if the rates of the second and third streams are varied in increments of not 10 percent but say 20 percent, that is, so that the flow rates of the first, second and third streams are 10, 70 and 20 percent, the two interfaces are to become stabilized at positions somewhat below the position of the lower interface at the preceding rates of flow. However, it can be readily calculated that 10 percent of the total rate of flow into the borehole is being injected into the increment between the upper interface at the present rates of flow and the lower interface of the preceding rates of flow.

It should be understood that the permeability profile or injectivity log of the formation 12 may also be determined by first providing a rate of flow of 90 percent of the total in the third fluid stream and 0 percent in the second fluid stream while the first fluid stream is maintained at a flow rate of 10 percent and then repeatedly varying the flow rates of the second and third streams in increments of 10 percent so that the two interfaces move in an upward direction along the wall of the borehole in formation 12.

It should also be understood that the second and third streams may have incorporated therein a radioactve substance while the first stream is non-radioactive. Furthermore, the invention is not limited to the use of a radiation detector to locate the position of the interfaces. The interfaces between the bodies of fluid in the borehole may be detected, for example, by using fluids which have different resistivities and instruments which are suitable for indicating the differences in the resistivities of the fluids, or by using fluids which have different acoustical characteristics and suitable acoustical logging devices.

Obviously, many other modifications and variations of the invention as hereinbefore set forth may be made without departing from the spirit and scope thereof and therefore only such limitations should be imposed as are indicated in the appended claims.

I claim:

1. A method of making permeability log in a borehole which compirses introducing a first fluid into the borehole to a given point therein, simultaneously introducing a second fluid into said borehole to a point below said given point so as to establish an interface between said first and second fluids, simultaneously introducing a third fluid into the borehole to a point above said given point so as to establish an interface between said first and third fluids, said first fluid having a detectable characteristic which is different from said second and third fluids, determining the depth in the borehole of said interfaces, varying the rates of flow of the three fluids being introduced into the borehole while maintaining constant the sum of the rates of the three fluids so as to cause said interfaces to move along the wall of said borehole to other depths, again determining the depths of the interfaces, and repeating these operations while noting the rates of flow of each of the three fluids being introduced into the borehole.

2. A method of making a permeability log in a borehole which comprises introducing a first fluid into said borehole to a given point therein, simultaneously introducing a second fluid into said borehole to a point below said given point so as to establish an interface between said first and second fluids, simultaneously introducing a third fluid into said borehole to a point above said given point so as to establish an interface between said first and third fluids, said first fluid having a detectable characteristic which is different from said second and third fluids, determining the depths in the hole of said interfaces, varying the rate of flow of the second and third fluids by an increment equal to the rate of flow of said first fluid while maintaining constant the sum of the rates of the three fluids so as to cause said interfaces to move along the wall of said borehole to other depths, again determining the depths of the interfaces and repeating these operations while noting the rates of each of the three fluids being pumped into the borehole.

3. The method of making a permeability log of a subsurface formation traversed by a well borehole containing a fixed tubing string extending approximately to the lower boundary of said formation and a movable tubing string extending approximately to the upper boundary of said formation, which comprises pumping fluid down through each of said tubing strings and through the annulus around said strings, the fluid pumped through said movable string containing a tracer material, first controlling the pumping rates so that the pumping rate through the movable tubing will be a predetermined percentage of the total pumping rate, the percentage pumping rate through the annulus will be zero and the percentage pumping rate through the fixed tubing will be the difference between said predetermined percentage and 100, locating the depths of the two interfaces in the well between the tracer-containing fluid and the upper and lower fluids, secondly lowering the bottom of the movable tubing to a point just below the depths of the previous lower interface, increasing the pumping rate through the annulus and decreasing the pumping rate through the fixed tubing by said predetermined percentage while maintaining the original pumping rate through the movable tubing whereby the upper interface will move down to the depth of the previous lower interface and the lower interface will move down to a new depth, locating the new depth of the lower interface and repeating these operations until the lower interface has reached the lower boundary of said formation while maintaining constant the sum of the pumping rates of the three fluid streams, the depths to which the lower interface moves after each change in pumping rates serving as a permeability profile of said formation.

4. The method defined in claim 3 in which the fluid pumped down the movable tubing is made radioactive and the said interfaces are located by making a radioactivity log of the fluid contents of the borehole.

5. The method defined in claim 3 in which the fluid pumped down the annulus and down the fixed tubing is made radioactive while the fluid pumped down the movable tubing is non-radioactive and the said interfaces are located by making a radioactivity log of the fluid contents of the borehole.

6. A method of making a permeability log of subsurface formations traversed by a borehole which comprises introducing a first fluid into the borehole to a given point therein, simultaneously introducing a second fluid into said borehole to a point below said given point so as to establish an interface between said first and second fluids, simultaneously introducing a third fluid into the borehole to a point above said given point so as to establish an interface between said first and third fluids, at least one of said fluids having a detectable characteristic different from the other fluids so as to define the interfaces, determining the depths in the borehole of said interfaces, varying the rates of the flow of the fluids being introduced into the borehole while maintaining constant the sum of the rates of the fluids so as to cause said interfaces to move along the wall of said borehole to other depths, again determining the depths of the interfaces and repeating these operations while noting the rates of flow of each of the fluids flowing into the borehole.

7. A method of making a permeability log of subsurface formations traversed by a borehole which comprises simultaneously introducing at a given flow rate a first fluid into the borehole to a given point therein, simultaneously introducing a second fluid into said borehole to a point at one side of and vertically displaced from said given point so as to establish an interface between said first and second fluids, simultaneously introducing a third fluid into the borehole to a point vertically displaced from and at the other side of said given point so as to establish an interface between said first and third fluids, at least one of the two fluids forming each of the two interfaces having a detectable characteristic different from the other of the two fluids, determining the depths in the borehole of said interfaces, varying the rate of flow of said second fluid by an amount equal to said given flow rate of said first fluid, varying the flow rate of at least one of the other two fluids so as to maintain constant the total flow rate of the three fluids, thus causing the interfaces to move along the wall of the borehole to other depths, again determining the depths of the interfaces and repeating these operations while noting the rates of flow of each of the three fluids being introduced into the borehole.

References Cited in the file of this patent

UNITED STATES PATENTS

| | | |
|---|---|---|
| 2,540,049 | Hinson | Jan. 30, 1951 |
| 2,700,734 | Egan et al. | Jan. 25, 1955 |
| 2,749,444 | Shea | June 5, 1956 |